(12) United States Patent
Smith et al.

(10) Patent No.: US 12,523,839 B2
(45) Date of Patent: Jan. 13, 2026

(54) END CONNECTOR FOR A FIBRE OPTIC MICRO DUCT

(71) Applicant: RELIANCE WORLDWIDE CORPORATION (UK) LIMITED, Middlesex (GB)

(72) Inventors: Joshua Smith, Middlesex (GB); Jack Braisher, Middlesex (GB)

(73) Assignee: Reliance Worldwide Corporation (UK) Limited, Middlesex (GB)

( * ) Notice: Subject to any disclaimer, the term of this patent is extended or adjusted under 35 U.S.C. 154(b) by 213 days.

(21) Appl. No.: 18/556,150

(22) PCT Filed: Apr. 7, 2022

(86) PCT No.: PCT/GB2022/050875
§ 371 (c)(1),
(2) Date: Oct. 19, 2023

(87) PCT Pub. No.: WO2022/223944
PCT Pub. Date: Oct. 27, 2022

(65) Prior Publication Data
US 2024/0184077 A1    Jun. 6, 2024

(30) Foreign Application Priority Data
Apr. 22, 2021 (GB) .................... 2105734

(51) Int. Cl.
*G02B 6/52* (2006.01)
*G02B 6/44* (2006.01)
*G02B 6/46* (2006.01)

(52) U.S. Cl.
CPC ............. *G02B 6/52* (2013.01); *G02B 6/4471* (2013.01); *G02B 6/475* (2023.05)

(58) Field of Classification Search
CPC ........ G02B 6/475; G02B 6/52; G02B 6/4471; G02B 6/4439; G02B 6/4463; G02B 6/4464; G02B 6/4466
(Continued)

(56) References Cited

U.S. PATENT DOCUMENTS

| 4,611,887 | A | * | 9/1986 | Glover | G02B 6/3897 385/71 |
| 2008/0011990 | A1 | * | 1/2008 | Kostet | G02B 6/4457 254/134 |
| 2011/0198450 | A1 | * | 8/2011 | Cloud | G02B 6/4466 248/65 |

FOREIGN PATENT DOCUMENTS

| CN | 100437182 C | * 11/2008 | ............... G02B 6/38 |
| CN | 101957480 A |   1/2011 | |

(Continued)

OTHER PUBLICATIONS

Search Report; British Patent Application No. GB2105734.4; Jan. 14, 2022.
(Continued)

*Primary Examiner* — James R Bidwell
(74) *Attorney, Agent, or Firm* — Barnes & Thornburg LLP

(57) ABSTRACT

An end connector for a fibre optic micro duct. The end connector includes a hollow housing open at a first end which comprises a connector to connect to the end of the micro duct. A flow path extends through the end connector. A gas pressure sensitive valve is provided in a second end of the housing opposite to the first end. The pressure sensitive valve is biased closed to block the flow path through the end connector when the pressure at the first end is below a threshold value and to open to allow gas to flow through the end connector when the pressure at the first end exceeds a threshold value.

20 Claims, 4 Drawing Sheets

(58) Field of Classification Search
USPC .......................................................... 406/14
See application file for complete search history.

(56) References Cited

FOREIGN PATENT DOCUMENTS

| DE | 102009036320 A1 * | 2/2011 | ................ B01J 3/02 |
|----|-------------------|--------|----------------------------|
| EP | 1832903 A1 | 9/2007 | |
| WO | 2021005319 A1 | 1/2021 | |

OTHER PUBLICATIONS

Search Report and Written Opinion; International Patent Application No. PCT/GB2022/050875; Aug. 1, 2022.

\* cited by examiner

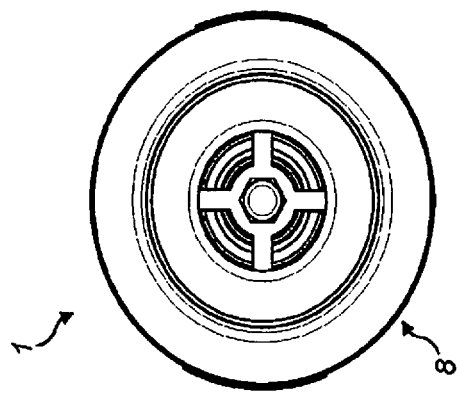
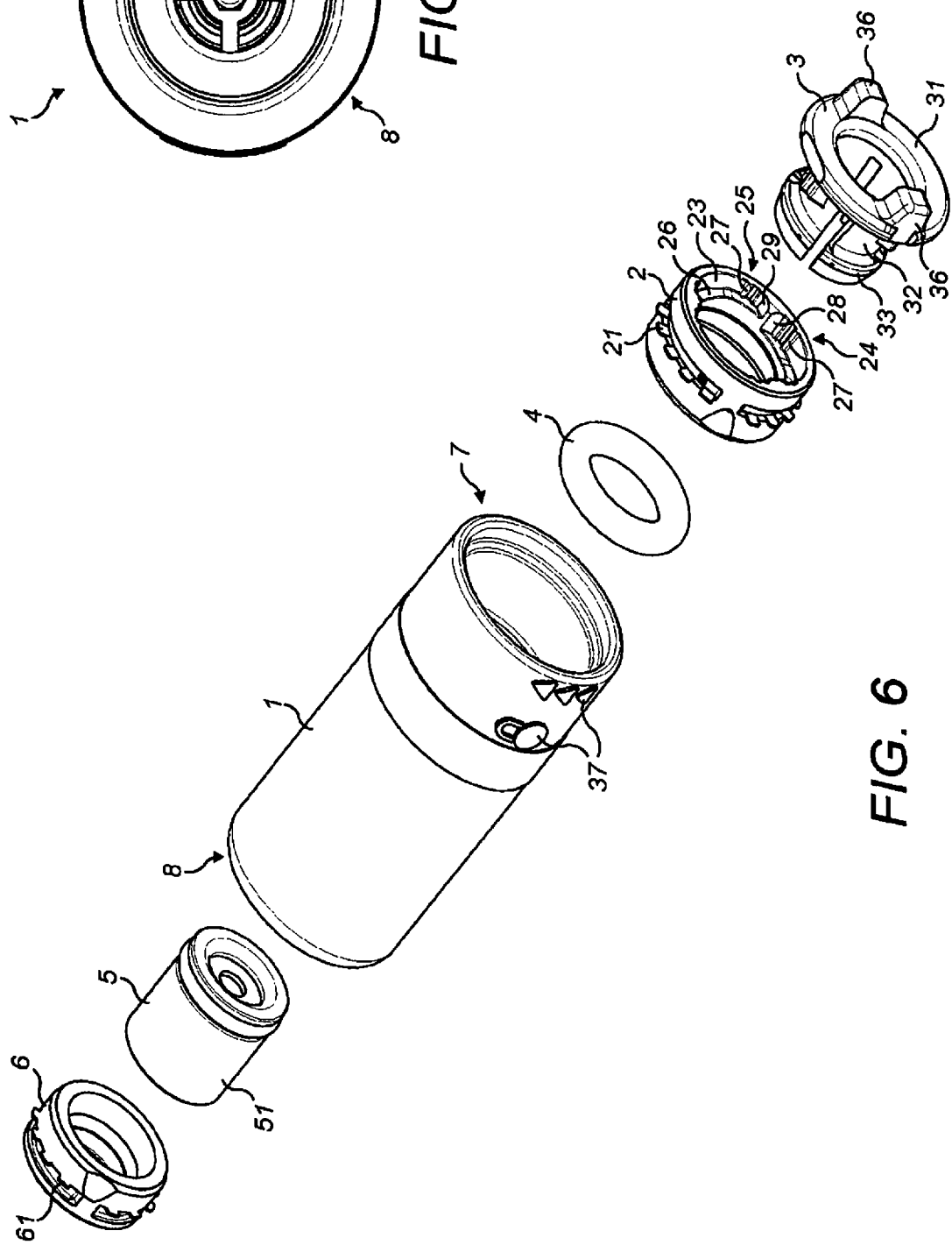

END CONNECTOR FOR A FIBRE OPTIC MICRO DUCT

PRIORITY CLAIM

This patent application is a U.S. National Phase of co-pending International Patent Application No. PCT/GB2022/050875, filed Apr. 7, 2022, which claims priority to British Patent Application No. 2105734.4, filed Apr. 22, 2021.

INCORPORATION BY REFERENCE

International Patent Application No. PCT/GB2022/050875, filed Apr. 7, 2022, and British Patent Application No. 2105734.4, filed Apr. 22, 2021, are incorporated herein by reference in their entirety.

FIELD

The present disclosure relates to an end connector for a fibre optic micro duct.

BACKGROUND

Optical fibres are increasingly being used to provide high speed data connections for internet access into buildings, such as homes, office buildings, or other residential or commercial buildings. The connection of the optical fibre into the building typically is done as a two-stage process. Firstly, the ducting for the fibre optic fibres is laid. As part of this process, a micro duct is run from a larger duct into the building. An end cap can be put in place at the end of the micro duct in the building, e.g., to prevent unwanted gasses and unpleasant aromas from entering the building along the micro and prevent unwanted matter from entering the duct.

As a second stage, which may happen months later, the optical fibre or fibre bundle is blown through the micro duct into the building. This traditionally requires two operators, one at the first end of the duct that blows the fibre and a second at the opposite end that removes the end cap and monitor the second end. This can be a time-consuming process as the operator at the first end needs to wait for the operator at the second end to gain access to the building and remove the end cap. This is particularly problematic in residential buildings as it is necessary to make an appointment with the building owner and for them to be available at the appointed time to allow operator access to the building.

Numerous attempts have been made to provide a system which does not require access to the building in order to carry out this second step. For example, a product made by Rehau, known as the Rauspeed, provides a wall mounted housing which is mounted to an internal wall of the building at the time that the micro duct is run into the building. Then, when it comes to the blowing in of the fibre, no access is required inside the building as the unit contains a number of features which allow the fibre to be blown in from the opposite end. However, these units are relatively expensive as they contain a significant number of components such as a sponge catcher, cable break, and water tank with associated connections, all of which are accommodated within the housing. As the unit is relatively expensive, it generally must be reused which can limit the flexibility of the installation operation because there is pressure on the installer not to leave them in place for too long. Although the unit may be reused multiple times, even this is still relatively expensive.

Another approach is disclosed in EP 1832903. EP 1832903 acknowledges a number of approaches which have been taken to avoid the need to have a second operator within the building during the blowing process. These include feeding a known length of conduit, using a barrier of porous material, detecting the arrival of the fibre using a light detector or by sensing that the fibre is slowing down or stopping. However, these methods have various drawbacks. EP 1832903 proposes the use of a pressure sensitive component, namely a diaphragm, which can be ruptured or dislodged or a cap which can be blown off attached to the end of the micro duct within the building. In addition, a detector is provided to sense a rapid change of pressure which occurs either when the diaphragm is dislodged or ruptures, or when the end cap is blown off. This rapid change of pressure is sensed to confirm that air is flowing through the duct. EP 1832903 also calls for a reservoir of a fluid designed to match the refractive index of the fibre. This is positioned to receive the end of the fibre such that, when the end of the fibre enters this reservoir, this provides a rapid decrease in the amount of reflected light thereby providing an indication that the fibre has reached the end of the micro duct.

SUMMARY

Embodiments of the present disclosure are not concerned with the sensing of the air and fibre at the end of the micro duct as in EP 1832903. Instead, the present disclosure is, in one aspect, aimed at providing an arrangement which can close off the end of the micro duct within the building, which can significantly simplify the structure required within the building that is provided with the Rauspeed system, as one example.

Accordingly, an end connector for a fibre optic micro duct is provided according to embodiments of the present disclosure. For example, an end connector for a fibre optic micro duct is provided. The end connector comprises a hollow housing open at a first end which comprises a connector to connect to the end of the micro duct. A flow path is defied or otherwise provided through the end connector. A gas pressure sensitive valve is provided in a second end of the housing opposite to the first end. The gas pressure sensitive valve can be biased closed to block the flow path through the end connector when the pressure at the first end is below a threshold value and to open to allow gas to flow through the end connector when the pressure at the first end exceeds the threshold value.

Embodiments of the present further can provide an end connector which blocks the end of the micro duct within a building such that it prevents a leakage of gas and unwanted aroma into the building prior to the blowing operation. However, in order to carry out the blowing operation, there generally is no need to have an operator within the building to remove the end connector, as the threshold value of the pressure sensitive valve is set at a level in which it will open at a pressure which is typically used for the fibre blowing process. This allows the gas to flow through the micro duct to propel the fibre through the duct.

The end connector represents a very significant simplification of the device required at the end of the micro duct and offers a cost reduction of at least an order of magnitude over the Rauspeed device, as an example. The end connector therefore can be left in place for as long as necessary.

EP 1832903 does not disclose a pressure sensitive valve which is biased closed. Instead, it has a pressure sensitive element such as the diaphragm or end cap but this is not biased closed. The purpose of this element is to create a rapid pressure changed caused by the abrupt failure or dislodging of the pressure sensitive element such that this pressure change is easily sensed by the sensor. A biased closed valve would not be suitable this sensing arrangement as it produces a much more gradual change in pressure as the valve element begins to open against the biasing force.

By providing a pressure valve which is biased closed, the end cap can provide a much more robust arrangement than the pressure sensing element in EP 1832903. Whether this is an end cap or a diaphragm, if it is dislodged or moved in the transportation and installation process, it will not be able to contain the pressure build up required in order to produce the rapid pressure drop needed for sensing and will effectively become useless. With the biased closed valve, even if the valve element is subject to some mishandling during transportation and installation, the biasing force will return the valve element to the closed position.

The pressure sensitive valve may be a single element which both biases the valve closed and blocks the gas path through the connector. However, optionally the pressure sensitive valve comprises a first element to provide the biasing force and a second element to block the gas path. The first element may, for example, be a helical spring or flexible legs which are mounted to provide a biasing force.

Between the first and second ends, the connector is optionally provided with a grille which is sized and configured to allow the flow of gas through the housing, but to provide an end stop for the optical fibre. The grille essentially provides a physical obstruction for the optical fibre while having one or more openings to maintain the flow path in this region. The operator then does not have to worry about the fibre being blown beyond the end of the micro duct as it will be stopped within the connector.

In EP 1832903, the end of the fibre is stopped by a fluid reservoir, rather than a grille. The reservoir is supported on a number legs which serve only to support the reservoir and play no role in stopping the end of the fibre.

The connector for the micro duct optionally includes a push-fit connector. This is a well known term of art for a connector which is made up simply by pushing the duct into the connector. This provides for a significantly quicker installation than for the Rauspeed device.

Furthermore, the connector optionally comprises an annular wall spaced radially inwardly from an outer wall of the housing and extending towards the first end, thereby defining an air gap between an outer wall of the housing and the annular wall, an inner face of the annular wall being dimensioned to receive the micro duct.

The presence of the annular wall at the closed end which is spaced from the outer wall of the housing serves to protect the end of the duct from deflection caused by an impact on the housing wall. If an impact occurs which deflects the outer wall of the housing inwardly, this will not cause the annular wall, and hence the wall of the duct, to be deflected unless the impact is large enough to close the air gap between the wall of the housing and the annular wall and then to causing the deflection of the annular wall. In practice, the gap between the walls can be engineered such that this would not happen in most types of impact which can be expected.

The annular wall and the housing at the closed end may be opaque, but generally is transparent such that the presence of a duct seated within the annular wall can be seen externally of the housing.

The connector may be a grab ring. This has a plurality of inwardly angled flexible teeth which grip an inserted duct. Any force tending to pull the duct out of the connector causes the teeth to deflect thereby increasing the gripping force on the duct. However, optionally the connector is a collet located in the open end of the housing and having a ring and a plurality of flexible arms extending generally axially of the ring into the housing, the housing having a tapered surface convergent towards the open end and the collet arms having heads at their distal ends for engaging both of the tapered surface and a duct extending, in use, through the collet into the housing to be compressed against the duct by the tapered surface with outward movement of the collet with respect of the housing to secure the duct in the end connector.

Optionally the connector further comprises a collet lock formed on the collet, the collet having a locked rotary position in which the lock holds the collet in an outward duct securing position and an unlocked rotary position in which the collet can move axially with respect to the housing for release and engagement of a duct by the collet; wherein one of the housing and the collet is provided with a cam surface and the other of the housing and the collet is provided with a cam follower, the cam surface being provided to provide the locked and unlocked positions.

This type of is collet is used in a single diameter connector disclosed in our earlier WO2021/005319.

Instead of the separate locking clip of the prior art, this uses a locking mechanism which is integrated into the end connector. This is much simpler to operate as there is no additional component which is relatively difficult to manipulate and easy to lose.

Because the locking is done by the interaction between the housing and the collet, the locking mechanism can effectively be internal to the housing. This can provide a low profile design and also protect the locking mechanism from impact damage and from the ingress of dirt.

The cam surface can be provided either on the housing or the collet, but generally is on the housing. In this case, the cam surface can be moulded directly into the housing as part of the housing moulding process. However, this requires relatively complex tooling, and the housing therefore optionally includes a cartridge retained by a main housing portion, the cartridge being provided with the cam surface. The cartridge may be fitted over or within the main housing portion. It may be retained by teeth which grip the main housing portion, ultrasonic welding, a snap fit, a screw fit, or in any other way.

In the locked position, the collet ring does not protrude axially beyond the housing. It may be flush with the housing, but generally is recessed into the housing. This protects the collet ring from impact damage and from dirt. In additional or alternative embodiments, the collet ring can protrude axially beyond the housing.

The connector is devoid of outer ribs and/or has a continuous outer surface of constant radius. The outer surface of constant radius also has a synergy with the requirement for the annular wall as this is an inner diameter which corresponds to the inner diameter of the collet. The outer surface of the constant radius provides a space which can accommodate the annular wall which is spaced from the outer wall of the housing.

The end connector is intended to be simple and compact, optionally, therefore the end connector comprising a single housing containing both the connector and the gas pressure sensitive valve. Also for simplicity and compactness the end connector has the connector to connect to the end of the micro duct at only one end of the end connector.

The present disclosure also extends to a method of installing an optical fibre in a building. For example, a method of installing an optical fibre within a building comprises: running a micro duct from a duct, at one end of the micro duct, to a building at the opposite end of the micro duct, such that the opposite end of the micro duct terminates within the building; fitting an end connector according to any one of the preceding claims at the opposite end of the micro duct within the building; and blowing an optical fibre or optical fibre bundle from the one end of the micro duct to the opposite end using a blowing pressure which is sufficient to open the pressure sensitive valve within the end connector.

By way of example, this provides a simple method of installing an optical fibre in a building which does not require an operator to be present in the building during the blowing operation.

The method optionally further comprises installing a coil of a micro duct within the building with the end connector at one end. The method optionally further comprises detecting an increase in the force required to blow the fibre through the coil of micro duct indicating that the fibre has entered the coil and terminating the blowing operation.

BRIEF DESCRIPTION OF THE DRAWINGS

Examples of end connectors in accordance with the present disclosure will now be described with reference to the accompanying drawings, in which:

FIG. 5 is an end view of the connector from the second end;
FIG. 6 is an exploded view of the connector from the first end.

DETAILED DESCRIPTION

The end connectors depicted in FIGS. 1 to 7 generally are designed to be fitted to the end of a micro duct within a building which is designed to subsequently receive an optical fibre or optical fibre bundle, as described in greater detail below.

Figure 1:
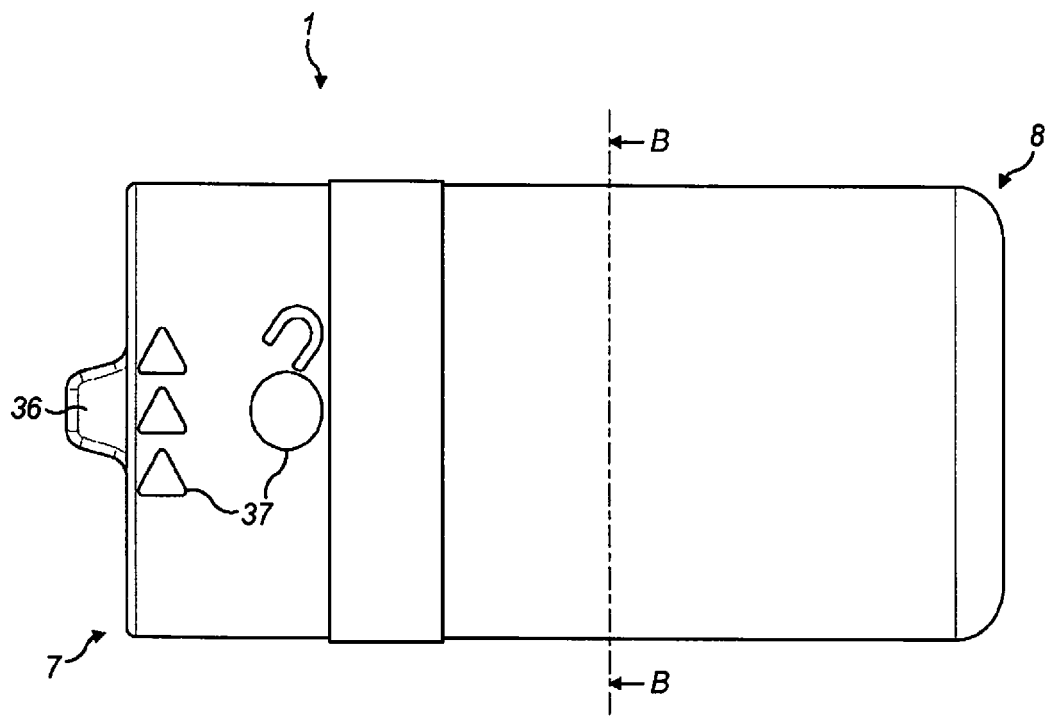
FIG. 1 is a side view of the connector.
Figure 2:
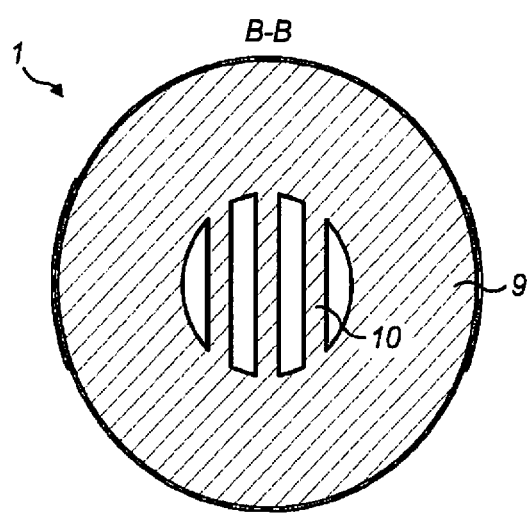
FIG. 2 is a cross section through line B-B in FIG. 1.
Figure 3:
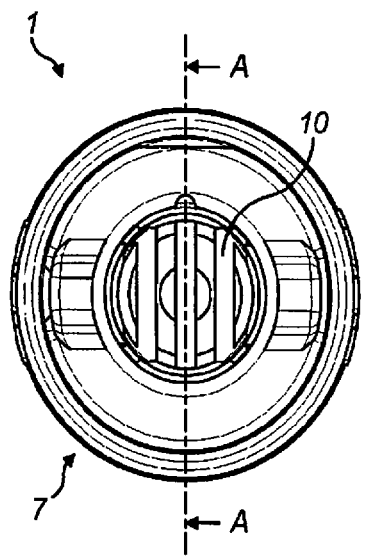
FIG. 3 is an end view of the connector from a first end.
Figure 4:
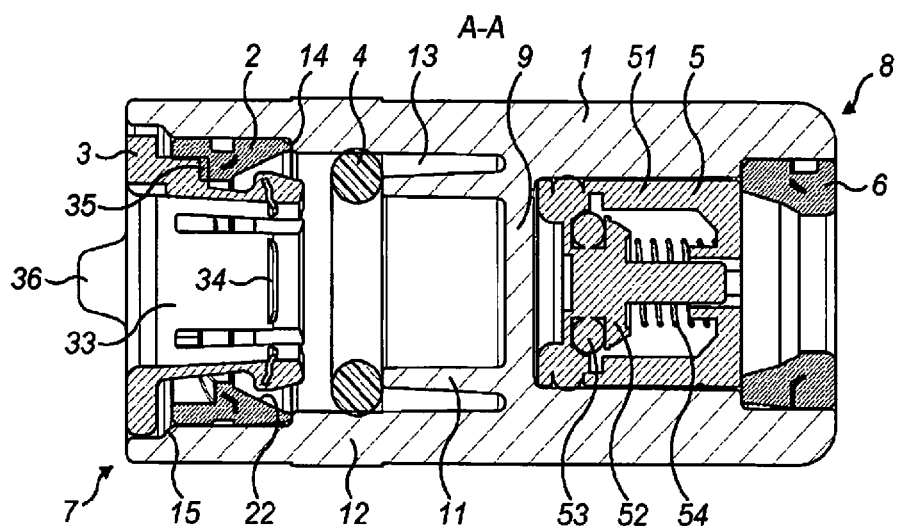
FIG. 4 is a cross-section through line A-A in FIG. 3.

The connector is made up of six main components as best shown in FIGS. 4 and 6, namely housing 1, cartridge 2, collet 3, seal 4, valve 5 and retaining ring 6.

The housing 1 is a hollow cylinder which is open a first end 7 to receive the cartridge 2, collet 3 and seal 4 and open at the second opposite end 8 to receive the valve 5 and retaining ring 6.

The housing 1 comprises an intermediate wall 9 with a grille or grating 10 with a plurality of openings which create a gas flow path through the housing. An annular wall 11 protrudes axially from the intermediate wall 9 part-way towards the first end 7 and is spaced from a side wall 12 creating an annular air gap 13. The micro duct is received within the annular wall 11.

During the installation process, an impact on the housing 1 may cause inward deflection of the housing wall 1. However, this will simply deflect into the air gap 13 such that it will not (other than in very extreme cases) cause any inward deflection of the micro duct in a manner which might disturb the integrity of the seal 4.

As well as providing enhanced impact protection, the air gap 11 provides additional benefits. Without it, the wall of the housing surrounding the micro duct would be significantly thicker to preserve the constant external radius of the housing. A thick part will cool unevenly leading to clouding of the plastic material and loss of transparency. The air gap 13 therefore contributes to enhanced transparency and better resiliency of the housing. The other end of the connector adjacent the valve may be opaque as there is no need to see the valve 5.

The side wall 12 is provided with a first annular shoulder 14 to receive the cartridge 2 and a second annular shoulder 15 adjacent to the first end 7 to receive the collet 3. The seal 4 is received on the end of the annular wall 11.

The housing 1 is formed of a transparent material providing a clear optical path from outside of the housing into the region within the side wall 12 to allow visual confirmation that the end of the micro duct has reached the intermediate wall 9. The seal 4 is also visible from outside of the connector.

The cartridge 2 and collet 3 together form a connector at the first end 7 of the end connector.

The cartridge 2 has a generally annular configuration. The outer surface is provided with a plurality of flexible metal teeth 21. The cartridge 2 is inserted into an end of the housing 1 until it seats against the first shoulder 14. The teeth 21 grip the wall of the housing 1 to ensure that the cartridge 2 is permanently retained in the housing 1. At the end of the cartridge 2 adjacent to the first shoulder 14, there is a tapered cam surface 22 which cooperates with the collet as described below. At the opposite end, the end face of the cartridge 2 is provided with a plurality of ramped surfaces 23. Each ramp surface has a low point 24 corresponding to an unlocked configuration and a high point 25 corresponding to a locked configuration within an inclined face 26 in between. Bumps 27 are provided at the interface between the high point 25 and the inclined face 26 and between the inclined face 26 and the low point 24. The low point 24 terminates at a first end stop 28 and the high point 25 terminates at a second end stop 29.

Most of the features of the collet 3 are conventional. It has a collet ring 31 from which a plurality of flexible arms 32 extend. Each arm has a head 33 at its distal end as is provided with an inwardly projected metal tooth 34.

With a micro duct inserted, any movement tending to pull the micro duct out of the connector causes the teeth 34 to grip into the micro duct, this pulls the heads 33 towards the tapered cam surface 22 on the cartridge 2 deflecting the arms 32 inwardly to provide a progressively increasing gripping force on the micro duct. This serves to hold the micro duct securely in place. This is the general manner in which a collet operates as will be understood by those having skill in the art.

The collet 3 has cam followers 35 extending from the collet ring 31 towards the ramped surface 23 on the cartridge 2. Alternatively, the cam arrangement may be inverted such that the ramped surface(s) is/are on the collet and the follower(s) is/are on the cartridge.

The collet ring 31 is also provided with a pair of tabs 36 which extend from the collet ring 31 the opposite direction to the followers 35.

The operation of the collet 3 will now be described. In an unlocked position, the collet 3 has been rotated such that cam followers 35 abut the first end stops 28 such that the cam followers are at the low point 24. In this position, the collet 3 has a relatively large degree of axial freedom as it can move to a position in which the heads 33 can be kept away from the tapered cam surface 22. If held in that position by a user, the micro duct can be withdrawn because the heads 33 are kept away from the tapered cam surface 22 such that the collet cannot grip the micro duct.

The collet 3 is then rotated into a locked position. In doing so, the followers 35 move up the inclined faces 26, over the bumps 27, providing a tactile feel to the user that a position has been reached, and onto the high point 25.

In the locked position, the collet 3 has nothing like the same degree of freedom as in the unlocked position so that it cannot be moved and held into an unlocked position where the teeth 34 disengage with the micro duct.

The only way to remove the micro duct in this locked configuration is for the user to grasp the tabs 36, rotate the collet 3 to the unlocked position, and manually hold the collet in the unlocked position while pulling the micro duct out of the housing 1.

The micro duct can be inserted with the collet 3 in the unlocked position as this allows for more scope for the arms 32 to be deflected upon insertion of the micro duct. However, even in the locked position, there can be a small clearance between the head 33 and the tapered cam surface 22. Thus, it is possible to insert the micro duct with the collet in the locked position. This is advantageous as it provides a simple assembly process. The user needs only to insert the micro duct into the collet. They do not need to concern themselves with the locking operation.

The collet ring 31 may be flush with or axially set back inside the housing 1. However, the tabs 36 extend beyond the end of the housing 1. In this position, the collet 3 is protected from external impacts by the housing 1. Further, because it is recessed within housing 1, it is protected to some extent. The only points where dirt can potentially enter internal workings of the connector are between the collet ring 31 and the micro duct and between the collet ring 31 and the housing 1. However, these are interfaces where tight tolerances can be applied. Further, because of the rotary action required to unlock the collet, even if some dirt does enter into these gaps, this is unlikely to jam the collet 3 in place as a rotary motion can readily generate sufficient torque to overcome any such sticking.

The tabs 36 have right angled corners. This allows them to be inserted into the cut end of a micro duct and scraped around the inner edge of the micro duct to remove any burrs which are formed during the cutting operation. The edge may be shaped in a different way to provide more effective burr removal.

The free end of a micro duct is inserted into the connector 1 until the end of the micro duct abuts against the intermediate wall 9 within the annular wall 11. The collet operates as described above to grip the micro duct. The user can visually verify that the micro duct is correctly in place and then, if necessary, rotate the collet ring 35 using the tabs 36 to lock the collet in place as described above. As shown, for example, in FIG. 1, the housing 1 is provided with visual indicia 37 to provide a visual indication whether the collet has been locked.

The operation of the valve 5 will now be described. The valve 5 includes a generally cylindrical component or housing 51 which is retained in the second end 8 by a retaining or grab ring 6 provided with a plurality of resilient radially outwardly extending annular teeth 61 which are configured to hold the retaining ring 6 in place. The inner diameter of the retaining ring 6 is smaller than the outer diameter of the valve 5 as shown in FIG. 4 to hold the valve 5 in place.

The housing 51 includes a hollow cylindrical configuration that is sized to fit within the second end 8 of the housing 1. The housing 51 contains a valve element 52 which has an O-ring 53 which seals against the housing 51. The valve element 52 is biased into the closed position by a biasing member, such as spring 54. The valve element 52 is biased closed with sufficient force to block the flow path through the connector when the pressure at the first end is below a threshold value. This prevents the exit of any unwanted gases from the micro duct into the building. The biasing force is small enough to allow the valve element 52 to allow gas to flow through the connector when a pressure, such as that caused by the blowing of the fibre, at the first end exceeds a threshold value.

The installation process for the optical fibre in a building will now be described.

A micro duct for the fibre optic cable (or bundle) is installed in a conventional manner in which the end of the micro duct terminates within the building. Typically, the end of the micro duct is coiled to provide a higher resistance path for the fibre to enable the operator to determine that the fibre is reaching the end of the micro duct. This also provides an excess length of ducting within the building which can later be cut down to the required length. Once the micro duct is installed, an end connector is pushed onto the end of the micro duct, as described above, so that the end of the micro duct is securely retained and sealed within the first end 7.

Once this phase of the installation is completed, the micro duct will typically be left in place for a number of weeks or months until the building is ready to have the fibre installed. At this point, the fibre will be blown form a remote position along the micro duct into the building. The biasing force provided by the spring 54 on the valve element 52 is designed to be at a level which will not open at the relatively low pressures encountered while the micro duct is awaiting the fibre optical installation. It will, however, open at the pressure in which the air is blown along the duct to propel the fibre.

Thus, as the air is blown along the pipe, the check valve 52 will open and allow a through flow of air which enables the fibre to be pulled along in the airflow.

The flow of air continues until the fibre enters the coil at the end of the micro duct at which point the flow resistance encountered by the cable increases. At this point, the operator is aware that they are approaching the end of the micro duct and will then continue the flow of air for a short while in order to ensure that the cable has reached the end of the micro duct. If the air flow is continued for slightly longer than necessary, this is without consequence as the fibre will simply abut against the grille 10 and will proceed no further.

At a later point, when the user is ready to complete the fibre connection, an operator enters the building and removes the connector by unlocking the collet and removing the connector as described above. They then are presented with a micro duct with a fibre at the distal end. They will then cut back the micro duct to the required length, at which point they can pack the gap between the micro duct and the fibre to seal the ends of the micro duct against further gaseous leakage. The fibre itself is then cut to the appropriate length.

As none of the components of the connector are damaged or permanently displaced during this operation, the connector can be reused. However, as it is a relatively inexpensive component, it may be used only once.

Figure 7:
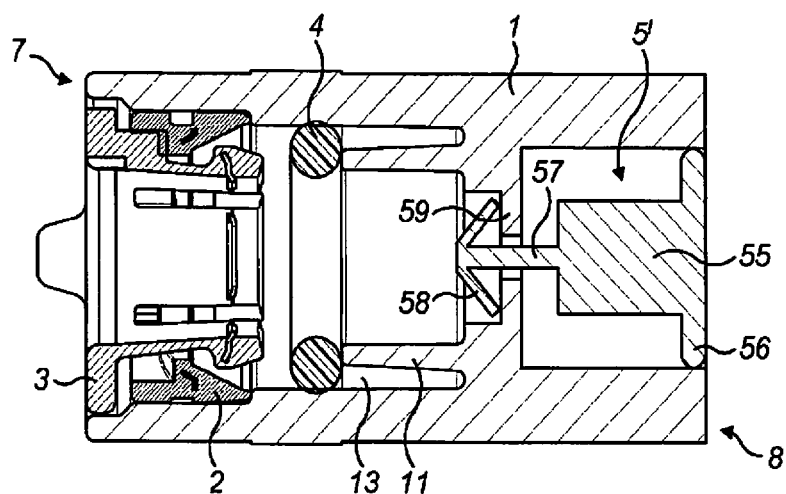
FIG. 7 is a view similar to FIG. 4 showing a second example of a connector.

An alternative design is shown in FIG. 7. This has the same design as cartridge 2, collet 3, and seal 4 as described above. However, the design of the valve 5' is different. The valve 5' is provided with a bung 55 which may, for example, be a TPE moulding. The bung 55 has a lip 56 which seals against an inner wall of the housing 1. A spigot 57 extends away from the bung 55 towards the first end 7 terminates at a pair of resilient legs 58 which are mounted behind a shoulder 59 within the housing. These legs may also be a TPE moulding which may be moulded at the same time as the bung 55 and spigot 57.

The mounting of the legs 58 against the shoulder 59 create a biasing force which urges the bung 55 to the left (as shown in FIG. 7). When air is blown through the connector from the first end 7, this impinges against the bung 55 and lip 56 and the pressure force is sufficient to overcome the biasing force created by the legs 58 thereby displacing the bung 55 to the right so that a gap is created between the lip 56 and the housing 1 allowing the air to pass through. When the air flow ceases, the resilience of the legs 58 will return the bung 55 to the sealed position shown in FIG. 7.

The invention claimed is:

1. An end connector for a fibre optic micro duct, the end connector comprising a hollow housing open at a first end which comprises a connector to connect to the end of the micro duct;
 a gas flow path through the end connector; and
 a gas pressure sensitive valve in a second end of the housing opposite to the first end, the gas pressure sensitive valve being biased closed to block the gas flow path through the end connector when the pressure at the first end is below a threshold value and to open to allow gas to flow through the end connector when the pressure at the first end exceeds the threshold value.

2. An end connector according to claim 1, wherein the gas pressure sensitive valve comprises a first element to provide the biasing force and a second element to block the gas flow path.

3. An end connector according to claim 1, wherein between the first and second ends, the end connector is provided with a grille which is sized to allow the flow of gas through the housing, but to provide an end stop for the optical fibre.

4. An end connector according to claim 1, wherein the end connector is a push-fit connector.

5. An end connector according to claim 1, wherein the end connector further comprises an annular wall spaced radially inwardly from an outer wall of the housing and extending towards the first end, thereby defining an air gap between an outer wall of the housing and the annular wall, an inner face of the annular wall being dimensioned to receive the micro duct.

6. An end connector according to claim 5, wherein the annular wall and the housing at the first end are transparent such that the presence of a duct seated within the annular wall can be seen externally of the housing.

7. An end connector according to claim 1, wherein the connector is a collet located in the open end of the housing and has a ring and a plurality of flexible arms extending generally axially of the ring into the housing, the housing having a tapered surface convergent towards the open end and the collet arms having heads at their distal ends for engaging both of the tapered surface and a duct extending, in use, through the collet into the housing to be compressed against the duct by the tapered surface with outward movement of the collet with respect of the housing to secure the duct in the end connector.

8. An end connector according to claim 7, wherein the connector further comprises a collet lock formed on the collet, the collet having a locked rotary position in which the lock holds the collet in an outward duct securing position and an unlocked rotary position in which the collet can move axially with respect to the housing for release and engagement of a duct by the collet; wherein one of the housing and the collet is provided with a cam surface and the other of the housing and the collet is provided with a cam follower, the cam surface being provided to provide the locked and unlocked positions.

9. An end connector according to claim 7, wherein the housing includes a cartridge retained by a main housing portion, the cartridge being provided with the cam surface.

10. An end connector according to claim 7, wherein in the locked position, the collet ring does not protrude axially beyond the housing.

11. An end connector according to claim 1, wherein the connector is devoid of outer ribs and/or has a continuous outer surface of constant radius.

12. An end connector according to claim 1, wherein the end connector has the connector to connect to the end of the micro duct at only one end of the end connector.

13. An end connector according to claim 1, wherein the end connector comprises a single piece housing surrounding both the connector and the gas pressure sensitive valve.

14. A method of installing an optical fibre within a building, the method comprising:
 running a micro duct from a duct, at one end of the micro duct, to a building at the opposite end of the micro duct, such that the opposite end of the micro duct terminates within the building;
 fitting an end connector according to any one of the preceding claims at the opposite end of the micro duct within the building;
 blowing an optical fibre or optical fibre bundle from the one end of the micro duct to the opposite end using a blowing pressure which is sufficient to open the pressure sensitive valve within the end connector.

15. A method according to claim 14, further comprising a step of installing a coil of a micro duct within the building with the end connector at one end.

16. A method according to claim 15, further comprising a step of detecting an increase in the force required to blow the fibre through the coil of micro duct indicating that the fibre has entered the coil.

17. An end connector for a fibre optic micro duct, the end connector comprising
 a hollow housing open at a first end which comprises a connector to connect to the end of the micro duct, the housing comprising an intermediate wall with a grille having a plurality of openings to create a gas flow path through the housing; and
 a gas pressure sensitive valve in a second end of the housing opposite to the first end, the gas pressure sensitive valve being biased closed to block the gas flow path through the end connector when the pressure at the first end is below a threshold value and to open to allow gas to flow through the end connector when the pressure at the first end exceeds the threshold value;
 wherein an annular wall protrudes axially from the intermediate wall towards the first end and is spaced from a side wall creating an annular air gap.

18. An end connector according to claim 17, wherein the hollow housing is formed of a transparent material.

19. An end connector according to claim 17, wherein the connector includes a cartridge and a collet, the cartridge being configured to seat against a first annular shoulder of the side wall when inserted into the hollow housing, the cartridge having a plurality of flexible teeth to grip the hollow housing, a plurality of ramped surfaces, and a tapered cam surface to cooperate with the collet.

20. An end connector according to claim 19, wherein the plurality of ramped surfaces each has a low point corresponding to an unlocked configuration and a high point corresponding to a locked configuration within an inclined face in between.

* * * * *